(12) United States Patent
Dakemoto et al.

(10) Patent No.: US 7,683,941 B2
(45) Date of Patent: Mar. 23, 2010

(54) IMAGE PICKUP APPARATUS (75) Inventors: Masumi Dakemoto, Tokyo (JP);
Narihiro Matoba, Tokyo (JP); Takeo Fujita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1059 days.

(21) Appl. No.: 10/567,251

(22) PCT Filed: Oct. 31, 2003

(86) PCT No.: PCT/JP03/14036

§ 371 (c)(1),
(2), (4) Date: Feb. 6, 2006

(87) PCT Pub. No.: WO2005/043924

PCT Pub. Date: May 12, 2005

(65) Prior Publication Data

US 2008/0225147 A1 Sep. 18, 2008

(51) Int. Cl.
*H04N 9/73* (2006.01)

(52) U.S. Cl. .................................. 348/226.1

(58) Field of Classification Search ............. 348/300, 348/226.1; 382/167
See application file for complete search history.

(56) References Cited

U.S. PATENT DOCUMENTS

| 6,573,933 | B1 * | 6/2003 | Takayama | 348/226.1 |
| 6,771,311 | B1 * | 8/2004 | Weldy | 348/222.1 |
| 2002/0044205 | A1 * | 4/2002 | Nagaoka et al. | 348/229 |
| 2003/0120365 | A1 * | 6/2003 | Asano et al. | 700/86 |
| 2004/0080630 | A1 * | 4/2004 | Kim | 348/226.1 |
| 2005/0062625 | A1 * | 3/2005 | Stoll | 341/123 |

FOREIGN PATENT DOCUMENTS

| EP | 0 146 941 A2 | 7/1985 |
| EP | 0 506 031 A1 | 9/1992 |
| EP | 1 091 571 A2 | 4/2001 |
| EP | 1 324 598 A2 | 7/2003 |
| JP | 7-274183 A | 10/1995 |
| JP | 8-294045 A | 11/1996 |
| JP | 10-257381 A | 9/1998 |
| JP | 11-32254 A | 2/1999 |
| JP | 2001-45502 A | 2/2001 |

* cited by examiner

*Primary Examiner*—Tuan Ho
(74) *Attorney, Agent, or Firm*—Birch, Stewart, Kolasch & Birch, LLP.

(57) ABSTRACT

As to an image signal of a solid-state image pickup device, an average value calculating unit calculates average values of pixel values of individual color components constituting an image of each frame. A gain calculating unit calculates, for the number of frames in one cycle of flicker generation, maximum values of the average values of the pixel values of the individual color components of the image, which average values are calculated by the average value calculating unit; calculates, according to the maximum values, gains for adjusting to a maximum range the average values of the pixel values of the individual color components constituting other images; and outputs the gains as gains of the individual color components to be supplied to a signal amplifying unit. The signal amplifying unit amplifies all pixels of color components of the image according to the gains of the individual color components supplied.

9 Claims, 10 Drawing Sheets

FIG.11 ated, and from the maximum value and minimum value of the luminance a correction coefficient for correcting the gradation of every field is calculated. In response to the luminance fluctuations in the input video signal, that is, to the cycle of the flicker, the gradation (luminance value) of the input video signal is corrected using the correction coefficient obtained one cycle before.

IMAGE PICKUP APPARATUS

TECHNICAL FIELD

The present invention relates to digital color image pickup equipment such as a digital still camera and digital video camera, and more particularly to an image pickup apparatus capable of acquiring high quality images with suppressing flicker produced under fluorescent lighting.

BACKGROUND ART

As a power supply frequency, 50 Hz and 60 Hz are used worldwide. Accordingly, some countries and regions have different power supply frequencies. In particular, Japan is divided into two regions. When a fluorescent lamp without an inverter function is used as a light fixture, the fluorescent lamp makes cyclic turning on and off 100 times per second in a 50 Hz region of the power supply frequency, and 120 times per second in a 60 Hz region of the power supply frequency.

When using a digital video camera or digital still camera including a solid-state image pickup device such as a CCD or CMOS sensor under fluorescent lighting, the amount of charge stored in the solid-state image pickup device can change every image read timing even though the solid-state image pickup device is set at the same exposure time because of the relationship between the image read timing (shutter speed) of the solid-state image pickup device and the blinking cycle of the fluorescent lamp. If the amount of charge stored in the solid-state image pickup device changes, the brightness of the image vary, which causes flickering like blinking of a video screen.

As a method of suppressing such flicker, a technique is known which is disclosed in Japanese patent application laid-open No. 10-257381/1998, for example. In the conventional technique, as for the input video signal of one field supplied from a CCD, its image is divided into a plurality of blocks in the horizontal direction, and average values of the luminance of individual blocks are calculated. Subsequently, average values that give a maximum value and a minimum value are calculated from the average values of the luminance calculated, and from the maximum value and minimum value of the luminance a correction coefficient for correcting the gradation of every field is calculated. In response to the luminance fluctuations in the input video signal, that is, to the cycle of the flicker, the gradation (luminance value) of the input video signal is corrected using the correction coefficient obtained one cycle before.

The conventional technique described in the foregoing document employs a method of calculating the average values of the luminance. Thus, it is a digital gain integrating method using only the luminance as an item to be calculated. However, since the ranges of the pixel values, which fluctuate because of the flicker, differ in individual color components constituting the image, the foregoing method cannot suppress the flicker accurately.

In addition, the power supply frequency has a minute error in practice, and sometimes deviates from an exact value of 50 Hz or 60 Hz. When the power supply frequency has a minute error, the method described in the foregoing document, which carries out correction according to the data one cycle before the flicker, cannot suppress the flicker accurately because the pixel signal one cycle before is not always equal to the pixel signal in the next cycle.

Furthermore, when the pixel values fluctuate because of external factors such as changes of an image pickup object, the integral of the digital gain based on the pixel values offers a problem of amplifying the flicker.

Moreover, the flicker elimination using the digital gain has a problem of reducing the S/N ratio and deteriorating the image quality because the digital gain is applied to all the pixels.

The present invention is implemented to solve the foregoing problems. Therefore it is an object of the present invention to provide an image pickup apparatus capable of suppressing the flicker accurately without fail when applied to the digital color image pickup equipment such as a digital video camera and digital still camera.

DISCLOSURE OF THE INVENTION

The image pickup apparatus in accordance with the present invention includes a solid-state image pickup device for acquiring an image signal by photoelectric conversion of an optical image formed; signal amplifying means for amplifying, as to the image signal supplied from the solid-state image pickup device, all pixels of color components of an image according to given gains of the individual color components; average value calculating means for calculating average values of pixel values of individual color components constituting an image of each frame generated by the signal amplifying means; and gain calculating means for calculating, for the number of frames in one cycle of flicker generation, maximum values of the average values of the pixel values of the individual color components of the image, which average values are calculated by the average value calculating means, for calculating, according to the maximum values, gains for adjusting to a maximum range the average values of the pixel values of the individual color components constituting other images, and for outputting the gains as gains of the individual color components to be supplied to the signal amplifying means.

Thus, it offers an advantage of being able to suppress the flicker by integrating the digital gains using the average values of the pixel values of the individual color components constituting the image, and by correcting the error caused by the effect of a fluorescent lamp at a power supply frequency having a minute error.

BEST MODE FOR CARRYING OUT THE INVENTION

The best mode for carrying out the invention will now be described with reference to the accompanying drawings to explain the present invention in more detail.

Embodiment 1

Figure 1:
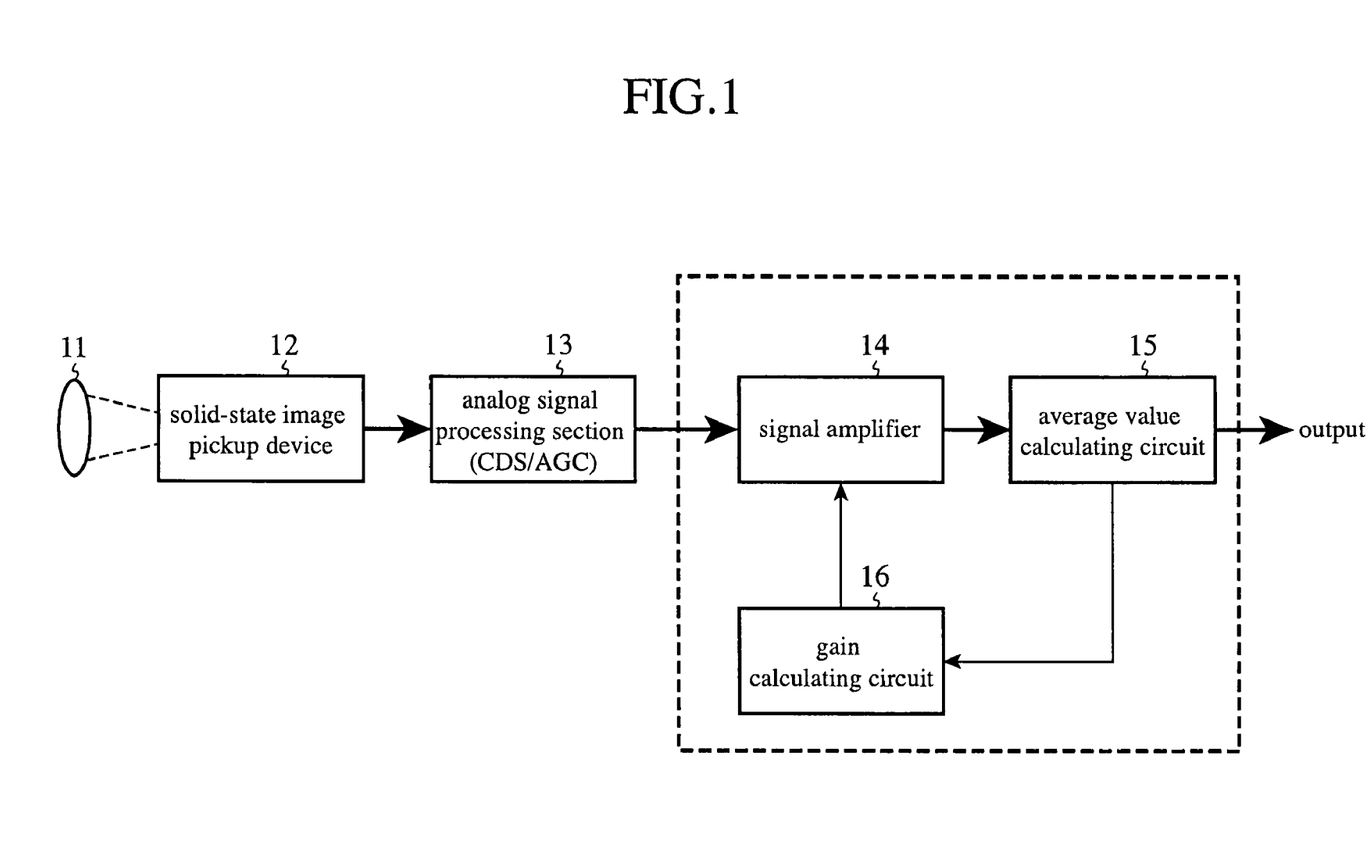
FIG. 1 is a block diagram showing a configuration of an image pickup apparatus of an embodiment 1 in accordance with the present invention.

FIG. 1 is a block diagram showing a configuration of an image pickup apparatus of an embodiment 1 in accordance with the present invention.

In FIG. 1, a solid-state image pickup device 12 is a means for acquiring an image signal by the photoelectric conversion of an optical image formed on a photoreceptive plane through a pickup lens 11. The solid-state image pickup device 12 is composed of a CCD, CMOS sensor or the like, and includes several hundreds of thousands of three types of pixels which are sensitive to red (R), green (G) and blue (B) lights and are alternately arrayed in a matrix. It converts the lights received by the individual pixels to charges, stores them, and outputs the stored charges as an analog signal. To achieve this, the solid-state image pickup device 12 has an electronic shutter function for controlling the storage time of the signal charges. An analog signal processing section 13, which includes circuits such as a CDS (Correlated Double Sampling circuit) and an AGC circuit, is a means for eliminating the noise from and controlling the gain of the image signal passing through the conversion by the solid-state image pickup device 12. A signal amplifier 14 is a means for carrying out, as to the image signal fed from the analog signal processing section 13, amplifying processing of all pixels of the RGB color components of the image according to the given gains of the RGB individual color components. An average value calculating circuit 15 is a means for calculating the average values of the pixel values of the individual RGB color components constituting the image of each frame generated by the signal amplifier 14. A gain calculating circuit 16 is a means for calculating the optimum gain from the average values of the pixel values of the RGB color components of each frame calculated, as will be described later.

Next, the operation will be described.

The pickup lens 11 forms an optical image input from the subject side on the photoreceptive plane of the solid-state image pickup device 12. The solid-state image pickup device 12 makes the photoelectric conversion of the optical image formed to obtain the image signal. The image signal passing through the conversion by the solid-state image pickup device 12 is input to the analog signal processing section 13. The analog signal processing section 13 eliminates the noise in the image signal and carries out the gain control. The image signal output from the analog signal processing section 13 is amplified through the signal amplifier 14, and is supplied to the average value calculating circuit 15. In this case, the signal amplifier 14 is supplied with the gains of the RGB color components from the gain calculating circuit 16, and carries out the amplifying processing of all the pixels of the RGB color components of the image according to the gains. The average value calculating circuit 15 calculates the average values of the pixel values of the individual RGB color components of the image of each frame generated by the signal amplifier 14, and the average values are supplied to the gain calculating circuit 16. As for the frames corresponding to the one cycle of the flicker generation, the gain calculating circuit 16 calculates the maximum values of the average values of the pixel values of the individual color components of the image of each frame. Then, according to the maximum values, the gains are calculated for adjusting the average values of the pixel values of the individual color components at a maximum range.

Using the gains calculated by the gain calculating circuit 16, the signal amplifier 14 amplifies all the pixels of the RGB color components. This makes it possible to reduce the difference of the brightness between the individual frames, which is caused by the difference of the amount of charges stored in the solid-state image pickup device 12, thereby suppressing the flicker.

Next, a calculating method of the average values of the pixel values carried out by the average value calculating circuit 15 will be described in detail.

The average values $\mu_{(R,G,B)}$ of the pixel values of the individual RGB color components are calculated using expression (1) for the individual RGB color components of the image generated by the signal amplifier 14.

$$\mu_{(R,G,B)} = \frac{\left(\sum_{j=1}^{P_H}\sum_{k=1}^{P_V} P_{(R,G,B)}(j,k)\right)}{P_H \cdot P_V} \quad (1)$$

where $P_{(R,G,B)}(j,k)$ is the pixel values of the individual RGB color components at the coordinates (j,k) of the image, which pixel values pass through the amplifying processing by the signal amplifier 14 and are stored in the average value calculating circuit 15; $P_H$ is the maximum number of pixels in the horizontal direction; and $P_V$ is the maximum number of pixels in the vertical direction.

The calculated average values of the pixel values of the individual RGB color components corresponding to the number of frames in the one cycle of the flicker are stored in the memory of the gain calculating circuit 16. Here, the number of frames $F_{Camera}/T_{Flicker}$ per cycle of the flicker, which is obtained in advance, is calculated using the following expression (2).

$$F_{Camera}/T_{Flicker} = \frac{F_{Camera}}{GCD(2 \times F_{Elec}, F_{Camera})} \quad (2)$$

where $F_{Camera}$ is the frame rate of the image pickup apparatus, $F_{Elec}$ is the power supply frequency, and GCD(A,B) designates the greatest common divisor of A and B.

Next, the gain calculating method by the gain calculating circuit 16 will be described.

The average values of the pixel values of the individual stored RGB color components in the one cycle of the flicker are compared, and the maximum values are calculated from them. Using the following expression (3), the gains $G_{[2](R,G,B)}(i)$ are obtained by modifying the calculated maximum values using the average values of other pixel values.

$$G_{[2](R,G,B)}(i) = G_{[1](R,G,B)}(i) \cdot \frac{\mu_{(R,G,B)}(\text{Max Number})}{\mu_{(R,G,B)}(i)} \quad (3)$$

where $\mu_{(R,G,B)}$(MaxNumber) is the maximum values of the stored average values of the pixel values in the one cycle, $\mu_{(R,G,B)}(i)$ is the ith stored average values of the pixel values in the one cycle, and $G_{[1](R,G,B)}(i)$ is the gains applied to the average values $\mu_{(R,G,B)}(i)$ of the pixel values of the individual RGB color components.

The gains $G_{[2](R,G,B)}(i)$ obtained by expression (3) are compared with each other. Assume that the minimum values of $G_{[2](R,G,B)}(i)$ are $G_{[2](R,G,B)}$(MinNumber). Then, the average values $[\mu_{(R,G,B)}$(MinNumber)/$G_{[1](R,G,B)}$(MinNumber)] of the pixel values of the individual RGB color components which do not undergo the MinNumber-th signal amplifying processing become a maximum value.

Using the following expression (4), the second gains $G_{[2](R,G,B)}(i)$ are adjusted in such a manner that the minimum value $G_{[2](R,G,B)}$(MinNumber) of the gains $G_{[2](R,G,B)}(i)$ obtained by expression (3) becomes 1.0.

$$G_{[3](R,G,B)}(i) = \frac{G_{[2](R,G,B)}(i)}{G_{[2](R,G,B)}(\text{Min Number})} \quad (4)$$

$$(i = 1, \ldots, [F_{Camera}/T_{Flicker}])$$

According to the gains $G_{[3](R,G,B)}(i)$ calculated by expression (4), the average values of the all the pixel values in one cycle can be adjusted to the maximum value $[\mu_{(R,G,B)}$(MinNumber)/$G_{[1](R,G,B)}$(MinNumber)] of the average values of the pixel values that do not undergo the signal amplifying processing.

The gains $G_{[3](R,G,B)}(i)$ calculated by the gain calculating circuit 16 are stored in the signal amplifier 14, and the signal amplifying processing is carried out for all the pixels of the individual RGB color components of the image using the following expression (5).

$$P_{Next(R,G,B)}(j,k) = G_{[3](R,G,B)}(i) \cdot p_{Next(R,G,B)}(j,k) \quad (5)$$

$$\begin{cases} (j = 1, \ldots, P_H) \\ (k = 1, \ldots, P_V) \end{cases}$$

where $P_{Next(R,G,B)}(j,k)$ is the pixel values of the individual RGB color components at the coordinates (j,k) of the pickup image in the next cycle after the signal amplifying processing, and $p_{Next(R,G,B)}(j,k)$ is the pixel values of the individual RGB color components at the coordinates (j,k) of the pickup image in the next cycle, which do not undergo the signal amplifying processing. In other words, setting the average values in one cycle of the flicker, which are calculated by the average value calculating circuit 15, at the following values according to $P_{Next(R,G,B)}(j,k)$ amplified by the signal amplifier 14, causes the flicker to be suppressed.

$$\mu_{Next(R,G,B)}(1) \approx \mu_{Next(R,G,B)}(2) \approx \ldots \approx \mu_{Next(R,G,B)}$$
$$([F_{Camera}/T_{Flicker}])$$

As described above, the embodiment 1 calculates the optimum gains using the average values of the pixel values of the individual RGB color components of the image. Thus, it offers an advantage of being able to suppress the flicker accurately.

Embodiment 2

Although the image signal the solid-state image pickup device outputs is an analog signal, it is converted to a digital signal to be applied to a variety of image processings. In this case, the gain for the A/D converted signal (digital image signal) is called a digital gain. Here, a system is proposed which suppresses the flicker by a method similar to that of the foregoing embodiment 1 when the digital gain is used.

Figure 2:
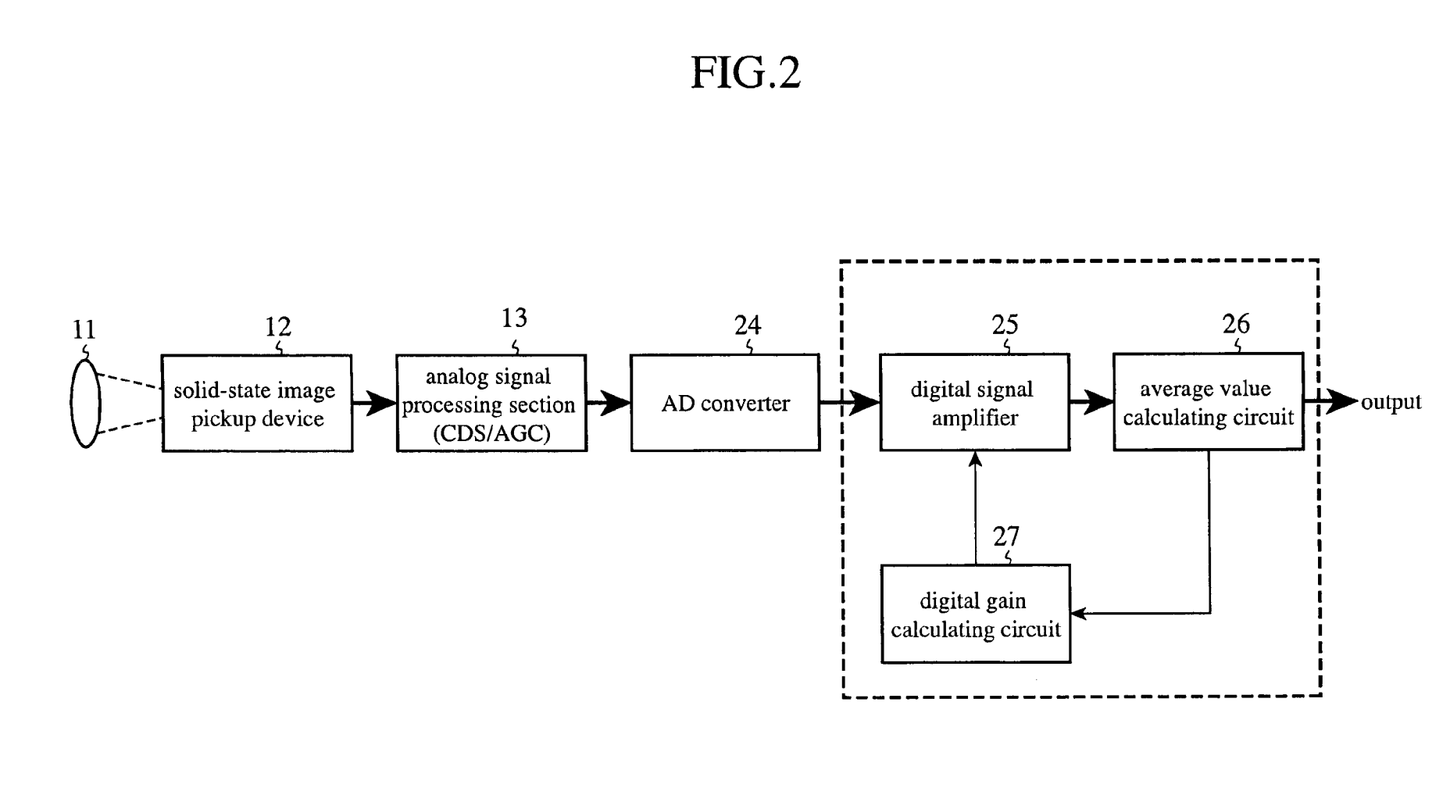
FIG. 2 is a block diagram showing a configuration of an image pickup apparatus of an embodiment 2 in accordance with the present invention.

FIG. 2 is a block diagram showing a configuration of an image pickup apparatus of an embodiment 2 in accordance with the present invention. In FIG. 2, the components corresponding to those of FIG. 1 are designated by the same reference numerals and their description is omitted as a rule. The image pickup apparatus includes a pickup lens 11, a solid-state image pickup device 12, an analog signal processing section 13, an AD converter 24, a digital signal amplifier 25, an average value calculating circuit 26, and a digital gain calculating circuit 27.

Next, the operation will be described.

The image signal output from the analog signal processing section 13 passes through the A/D conversion by the AD converter 24, and becomes a digital image signal. The digital signal amplifier 25, using the digital gains of the individual RGB color components calculated by the digital gain calculating circuit 27, carries out the amplifying processing of all the pixels of the individual RGB color components of the digital image. The average value calculating circuit 26 calculates the average values of the pixel values of the individual RGB color components of the image generated by the digital signal amplifier 25 using the same function as the average value calculating circuit 15 of FIG. 1. The digital gain calculating circuit 27 calculates the optimum digital gains from the average values of the pixel values of the individual RGB color components calculated by the average value calculating circuit 26. The digital gain calculating circuit 27 has the digital gain converting function added to the function substantially equivalent to that of the gain calculating circuit 16 of FIG. 1.

Next, the flicker suppressing method using the digital gains will be described.

The digital gain calculating circuit 27 obtains the optimum digital gains from expression (4) by carrying out the processing with the same procedure as that of the embodiment 1. The calculated optimum gains undergo the digital gain converting processing using the following expression (6).

$$DG_{[3](R,G,B)}(i) = k_{DG(R,G,B)} \cdot G_{[3](R,G,B)}(i) \ (i=1, \ldots, [F_{Camera}/T_{Flicker}]) \quad (6)$$

where $DG_{[3](R,G,B)}$ is the digital gains obtained by converting the optimum gains $G_{[3](R,G,B)}(i)$ obtained by expression (4), and $k_{DG(R,G,B)}$ is conversion coefficients for converting the gains $G_{[3](R,G,B)}(i)$ to the digital gains. The conversion coefficients $k_{DG(R,G,B)}$ are predetermined by calculating the rates of changes of the pixel values for the changes of the digital gains $DG_{[3](R,G,B)}$ from the actually measured values.

The digital gains $DG_{[3](R,G,B)}(i)$ calculated by the digital gain calculating circuit 27 are once stored in the digital signal amplifier 25. Using the data, the digital signal amplifier 25 carries out the amplifying processing of the all the pixels of the individual RGB color components of the pickup image according to the following expression (7).

$$P_{Next(R,G,B)}(j, k) = DG_{[3](R,G,B)}(i) \cdot p_{Next(R,G,B)}(j, k) \quad (7)$$

$$\begin{cases} (j = 1, \ldots, P_H) \\ (k = 1, \ldots, P_V) \end{cases}$$

As described above, the present embodiment 2 is configured such that it calculates the optimum digital gains using the average values of the pixel values of the individual RGB color components of the image. Thus, it offers an advantage of being able to suppress the flicker accurately.

Embodiment 3

The foregoing embodiment 2 carries out the suppressing of the flicker under the assumption that the average values of the pixel values of the individual RGB color components in the present cycle are substantially equal to the average values of the pixel values of the individual RGB color components in the next cycle. As for the power supply frequency, however, although it is stabilized, it is not always exactly 60 Hz or 50 Hz in practice, but can have a minute error. The power supply frequency error appears as an error of the changing pattern of the flicker.

Figure 3:
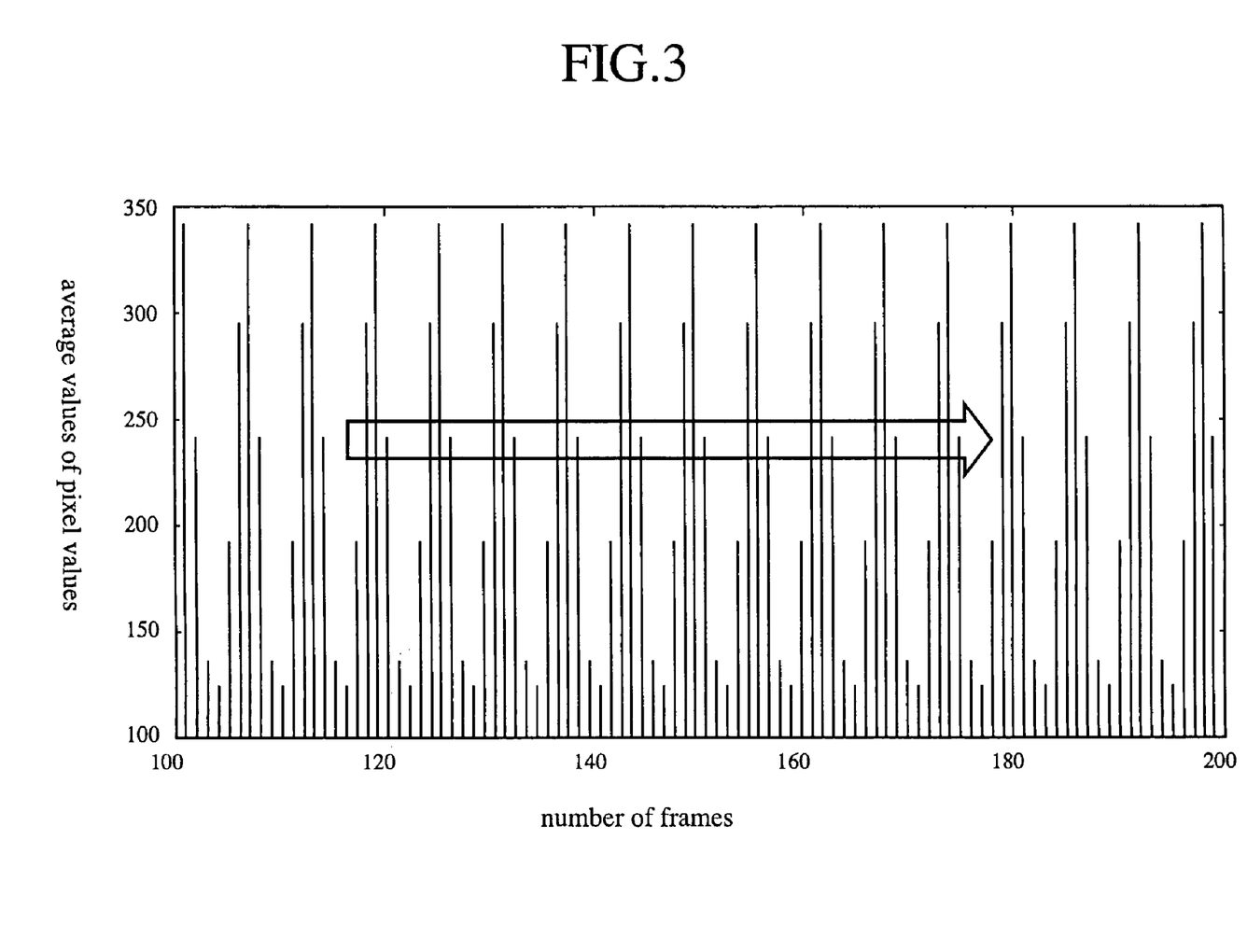
FIG. 3 is a graph illustrating fluctuations in the average values of the pixel values picked up under fluorescent lighting at a power supply frequency of 50.00 Hz.
Figure 4:
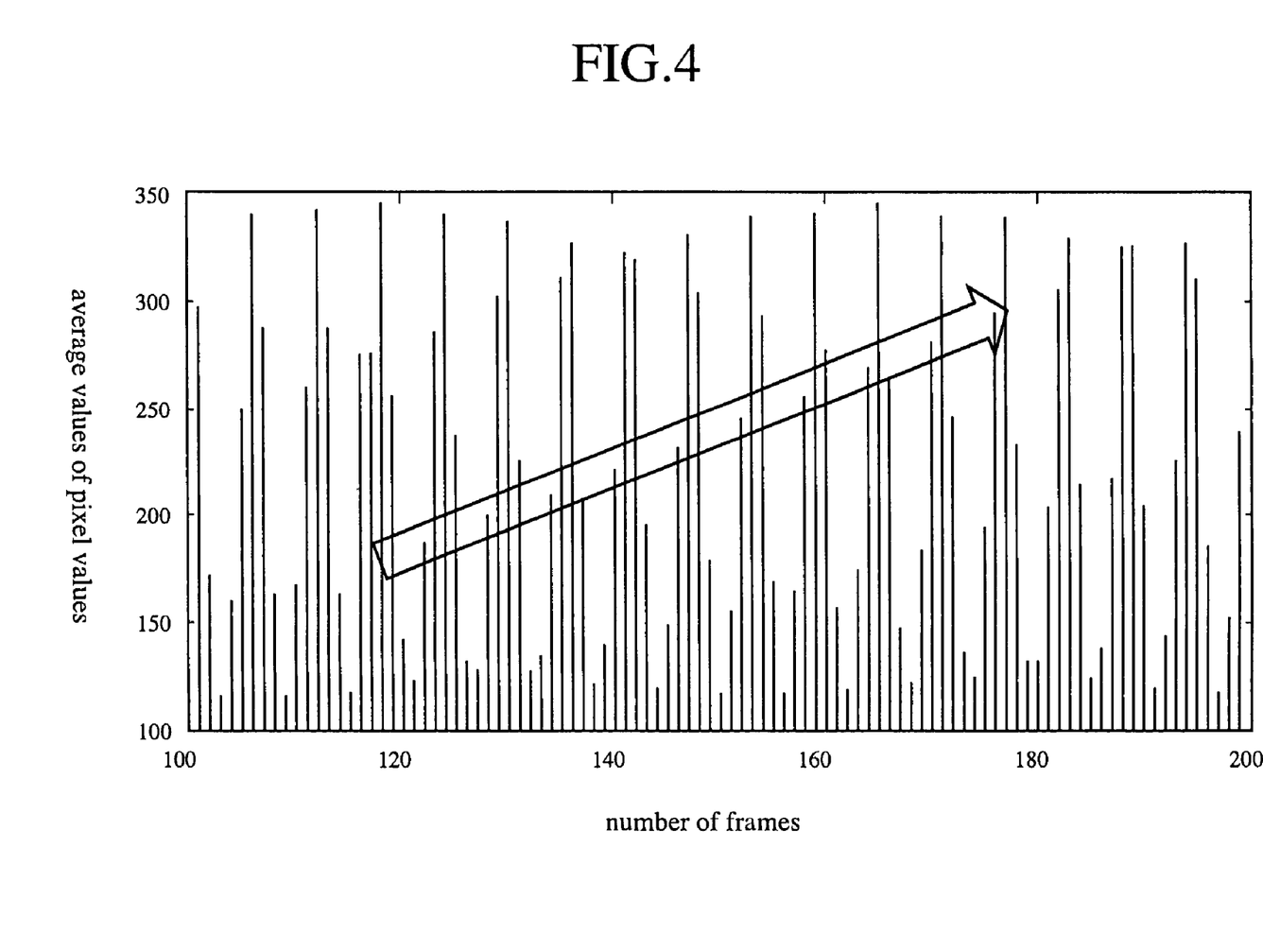
FIG. 4 is a graph illustrating fluctuations in the average values of the pixel values picked up under fluorescent lighting at a power supply frequency of 50.04 Hz.

FIG. 3 illustrates fluctuations in the average values of the pixel values when taking picture at a frame rate of 24 fps under fluorescent lighting with the power supply frequency being fixed at 50.00 Hz. On the other hand, FIG. 4 illustrates fluctuations in the average values of the pixel values when taking picture at a frame rate of 24 fps under fluorescent lighting with the power supply frequency being fixed at 50.04 Hz. In both figures, the vertical axis represents the average values of the pixel values and the horizontal axis represents the number of frames. As clearly seen from FIG. 4, the average values of the pixel values increase with the number of frames. Accordingly, the flicker cannot be always suppressed effectively if the digital gain is determined under the assumption that the power supply frequency is precisely 60 Hz or 50 Hz, and that the average values of the pixel values in the present cycle are substantially equal to the average values of the pixel values in the next cycle.

To solve the problem when the power supply frequency has a minute error, the estimation of the error and the determination of the optimum digital gains will be described. Although the configuration of the image pickup apparatus in the present embodiment 3 is basically the same as that of FIG. 2, the processing carried out in the digital gain calculating circuit 27 differs as will be described below.

Figure 5:
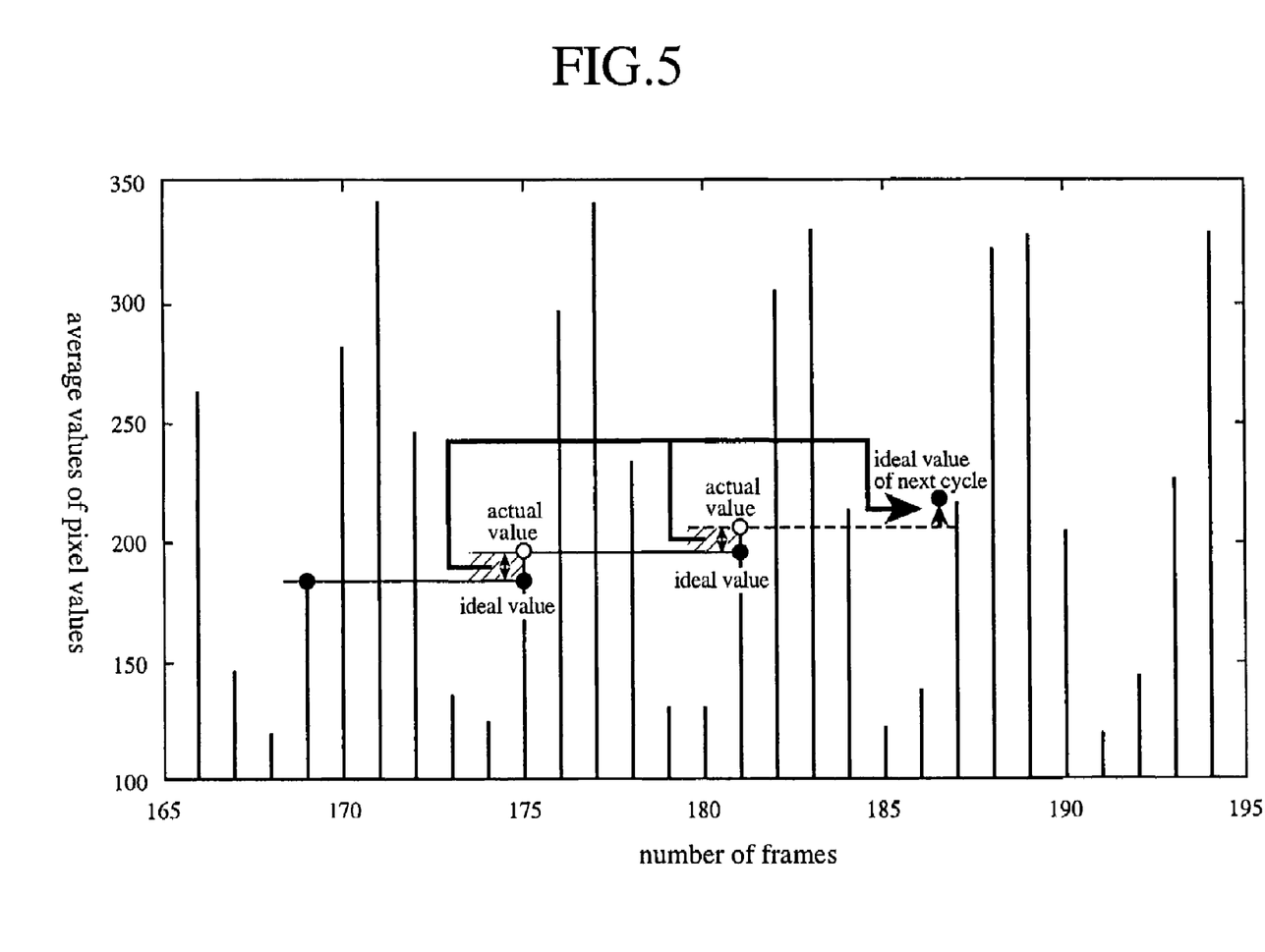
FIG. 5 is a graph illustrating a method of estimating the minute error of the power supply frequency in an embodiment 3 in accordance with the present invention.

FIG. 5, which relates to the present embodiment 3, is a graph illustrating a method of estimating the error when the power supply frequency has a minute error. In FIG. 5, the vertical axis represents the average values of the pixel values, and the horizontal axis represents the number of frames. In addition, solid lines on the graph represent the average values of the pixel values of individual frames; closed circles represent ideal values in the next cycles estimated from the average values of the pixel values in the previous cycles; open circles represent the actual average values of the pixel values (actual values) deviated because of the minute error of the power supply frequency.

The digital gain calculating circuit 27 calculates first the deviation of the flicker generation cycle resulting from the power supply frequency error from the average values of the pixel values of the individual color components, which are calculated by the average value calculating circuit 15 and constitute the image of each frame. More specifically, as to the average values of the pixel values, the digital gain calculating circuit 27 obtains the averages of the errors between the ideal values and actual values in several previous cycles. Assuming that the average values of the pixel values are varied regularly, the minute error of the power supply frequency will have approximately the same error in the next cycle as the error between the ideal values and actual values in the several previous cycles. Accordingly, the digital gain calculating circuit 27 calculates the error.

Next, the deviation of the flicker generation cycle will be corrected. This corresponds to calculating the ideal values $\mu'_{Next(R,G,B)}(i)$ in the next cycle, which are closer to the actual values in the next cycle, using the following expression (8) with considering the error obtained in the several previous cycles.

$$\mu'_{Next(R,G,B)}(i) = \mu_{Next(R,G,B)}(i) \cdot Ave\left(\frac{\mu_{Real(R,G,B)}(i)}{\mu_{Ideal(R,G,B)}(i)}\right) \quad (8)$$

$$(i = 0, \ldots, [F_{Camera} / T_{Flicker}])$$

where $\mu_{Next(R,G,B)}(i)$ is the ideal values in the next cycle, $\mu_{Real(R,G,B)}(i)$ is the actual values in the several previous cycles, $\mu_{Ideal(R,G,B)}(i)$ is the ideal values in the several previous cycles, and Ave(X) is the average value of X.

Following this, as to the calculated average values of the pixel values passing through the correction of the deviation of the flicker generation cycle, that is, as to the ideal values $\mu'_{Next(R,G,B)}(i)$ in the next cycle, the digital gain calculating circuit 27 calculates the digital gains using the same method as described in the embodiment 2, and supplies the digital gains to the digital signal amplifier 25, thereby suppressing the flicker.

As described above, the present embodiment 3 is configured such that it estimates the deviation of the flicker generation cycle resulting from the power supply frequency error in terms of the errors of the average values of the pixel values; calculates the average values of the pixel values as the ideal values in the next cycle which are closer to the actual values; and adjusts the digital gains according to the ideal values using the method of the foregoing embodiment 2. As a result, it offers an advantage of being able to suppress the flicker accurately which is produced under the fluorescent lighting at the power supply frequency having the minute error.

Embodiment 4

The foregoing embodiment 3 estimates the average values of the pixel values in the next cycle from the averages of the errors between the ideal values and actual values in the several previous cycles. This is substantially equivalent to the linear estimation of the error.

Figure 6:
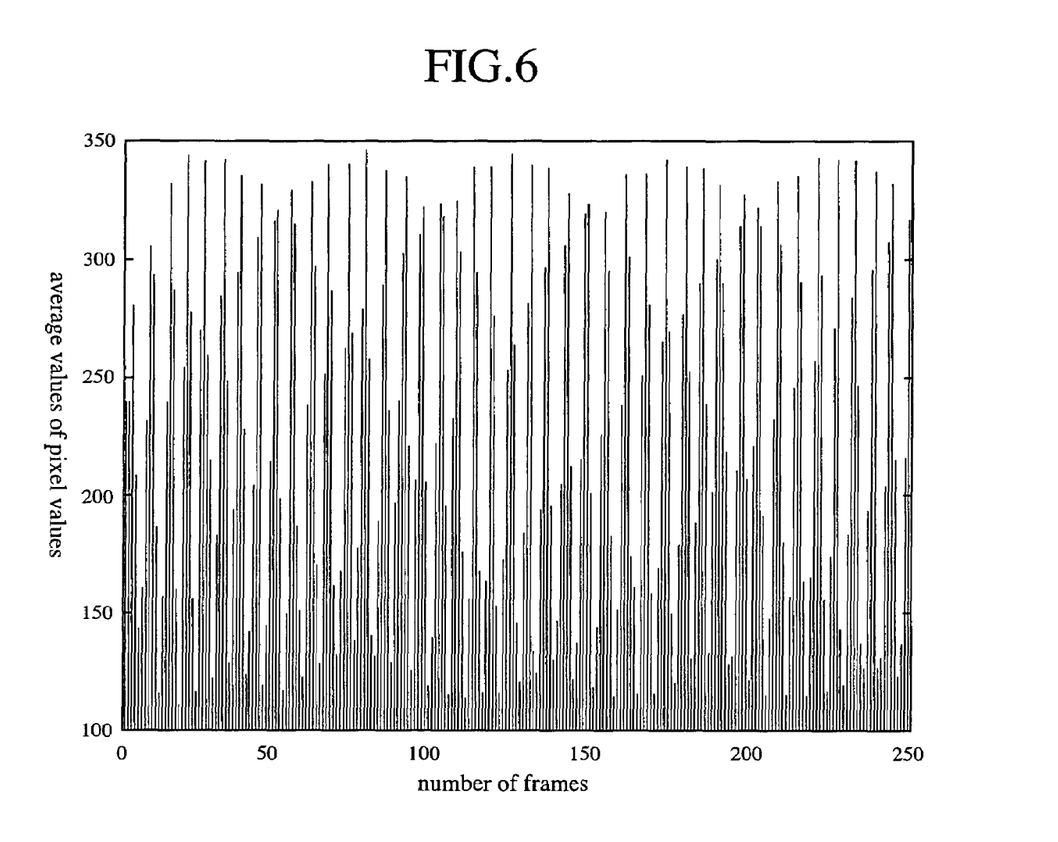
FIG. 6 is a graph illustrating fluctuations in the average values of the pixel values picked up under fluorescent lighting at a power supply frequency having an error.

When the power supply frequency has a minute error, the deviation of the average values of the pixel values of each cycle follows a fixed waveform. FIG. 6 illustrates fluctuations in the average values of the pixel values when taking picture under fluorescent lighting at the power supply frequency having an error. The vertical axis represents the average values of the pixel values and the horizontal axis represents the number of frames. This is an example of taking picture at the frame rate of 24 fps under fluorescent lighting with fixing the number of frames at 250 and the power supply frequency at 50.04 Hz. Lines extending in the vertical direction represent the average values of the pixel values the individual frames. It is confirmed from FIG. 6 that the deviation of the average values of the pixel values of each cycle accords with a fixed waveform.

As described above, when the deviation of the average values of the pixel values of individual cycles follows a certain fixed waveform, there is no problem in the linear estimation of the embodiment 3 as long as the deviation range of the average values of the pixel values is minute. However, when the deviation range is large, the linear estimation of the error in the neighborhood of the maximum values and minimum values of the waveform results in an increase in the errors between the ideal values and actual values as a natural consequence. In view of this, in the present embodiment 4, a method will be described of estimating the error using a sine wave table instead of the linear error estimation.

Figure 7:
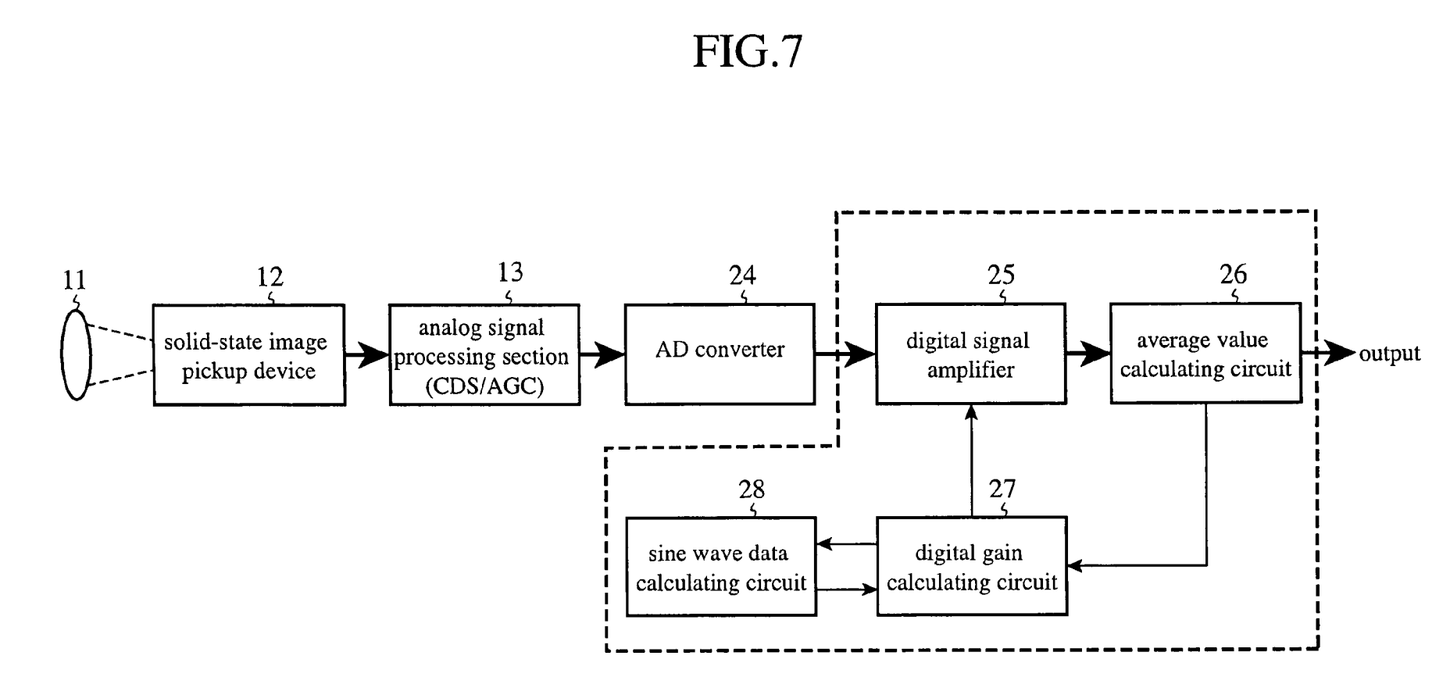
FIG. 7 is a block diagram showing a configuration of an image pickup apparatus of an embodiment 4 in accordance with the present invention.

FIG. 7 is a block diagram showing a configuration of an image pickup apparatus of the embodiment 4 in accordance with the present invention. In FIG. 7, portions corresponding to those of FIG. 2 are designated by the same reference numerals. The present embodiment 4 differs from the embodiment 2 in that a sine wave data calculating circuit 28 is newly added to the digital gain calculating circuit 27, and that the digital gain calculating circuit 27 has different processing contents.

Figure 8:
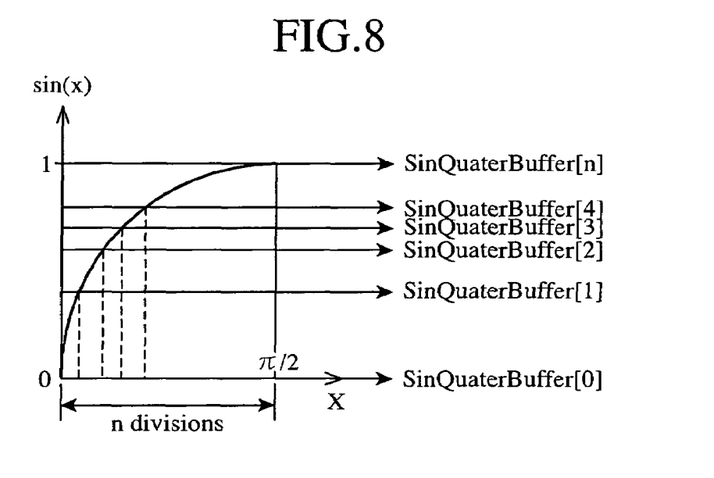
FIG. 8 is a graph illustrating a method of creating a sine wave data table in the embodiment 4 in accordance with the present invention.

The sine wave data calculating circuit 28 is a means for estimating, using the sine wave data table prepared in advance, the deviation in the next cycle to the flicker generation according to the sine wave data table number input from the digital gain calculating circuit 27. As for a creating method of the sine wave data table used in the processing, it is shown in FIG. 8. With assigning X to the horizontal axis and Sin(X) to the vertical axis, the sine wave data table SinQuaterBuffer[i] is created according to the following expression (9) by dividing the region from x=0 to x=π/2 by n.

$$SinQuaterBuffer[i] = \sin\left[\frac{(\pi/2)}{n} \cdot i\right] \quad (i = 0, 1, \ldots, n) \quad (9)$$

The sine wave data table given by expression (9) is stored in the sine wave data calculating circuit 28. The sine wave data calculating circuit 28 creates an expanded version sine wave data table SinBuffer[i] of the half cycle from x=π to x=2π in a quasi manner with the maximum value equal to two and minimum value equal to zero according to the conditions of the following expression (10) as to the sine wave data table SinQuaterBuffer[i], where i denotes the sine wave data table number.

$$SinBuffer[i] = \begin{cases} SinQuaterBuffer[n-i] & \text{if } (0 \le i \le n-1) \\ 1 + SinQuaterBuffer[(i-n)] & \text{if } (n \le i \le 2n-1) \end{cases} \quad (10)$$

Thus, the sine wave data calculating circuit 28 returns the output SinBuffer[i] for the input i.

The digital gain calculating circuit 27 calculates the deviation of the flicker generation cycle resulting from the power supply frequency error from the average values of the pixel values of the individual color components constituting the image in one flicker cycle calculated by the flicker average value calculating circuit 26, and estimates the sine wave data table number according to the calculated deviation. Subsequently, the digital gain calculating circuit 27 acquires the sine wave data of the next cycle from the sine wave data calculating circuit 28 according to the estimated sine wave data table number; calculates, according to the sine wave data in the next cycle, the average values of the pixel values which undergo the deviation correction in the next cycle of the flicker generation; and as to the number of frames in one cycle of the flicker generation, calculates the maximum values of the average values of the pixel values which undergo the deviation correction of the individual color components of the image of each frame. In addition, according to the maximum values, the digital gain calculating circuit 27 calculates the digital gains that will adjust the average values of the pixel values of the individual color components constituting other images to a maximum range.

The details of the processing of the digital gain calculating circuit 27 will now be described.

The digital gain calculating circuit 27 calculates using the following expression (11) the average values $\mu_{NoGain(R,G,B)}(i)$ of the pixel values which are at the ith place in the one cycle of the flicker and do not undergo the digital signal amplifying processing, from the average values of the pixel values of the individual RGB color components in the one cycle of the flicker calculated by the average value calculating circuit 26.

$$\mu_{NoGain(R,G,B)}(i) = \mu_{(R,G,B)}(i)/DG_{[1]}(i) \quad (11)$$

where $\mu_{(R,G,B)}(i)$ is the average values of the ith pixel values in one cycle of the flicker calculated by the average value calculating circuit 26, and $DG_{[1]}(i)$ is the digital gains used by $\mu_{(R,G,B)}(i)$.

Then, using the following expression (12), the digital gain calculating circuit 27 normalizes the average values $\mu_{NoGain(R,G,B)}(i)$ of the pixel values, which are at the ith place in the one cycle of the flicker and do not undergo the digital signal amplifying processing, to the size with the maximum value of two and the minimum value of zero.

$$N_{(R,G,B)}(i) = \frac{\mu_{NoGain(R,G,B)}(i) - \text{Min}(\mu_{NoGain(R,G,B)}(i))}{[\text{Max}(\mu_{NoGain(R,G,B)}(i)) - \text{Min}(\mu_{NoGain(R,G,B)}(i))]/2} \quad (12)$$

where $N_{(R,G,B)}$ is the results of the normalization of $\mu_{NoGain(R,G,B)}(i)$ to the size with the maximum value of two and minimum value of zero; $\text{Min}(\mu_{NoGain(R,G,B)}(i))$ is the minimum values of the deviation waveform of the average values of the pixel values of each frame; $\text{Max}(\mu_{NoGain(R,G,B)}(i))$ is the maximum values of the deviation waveform of the average values of the pixel values of each frame.

Figure 9:
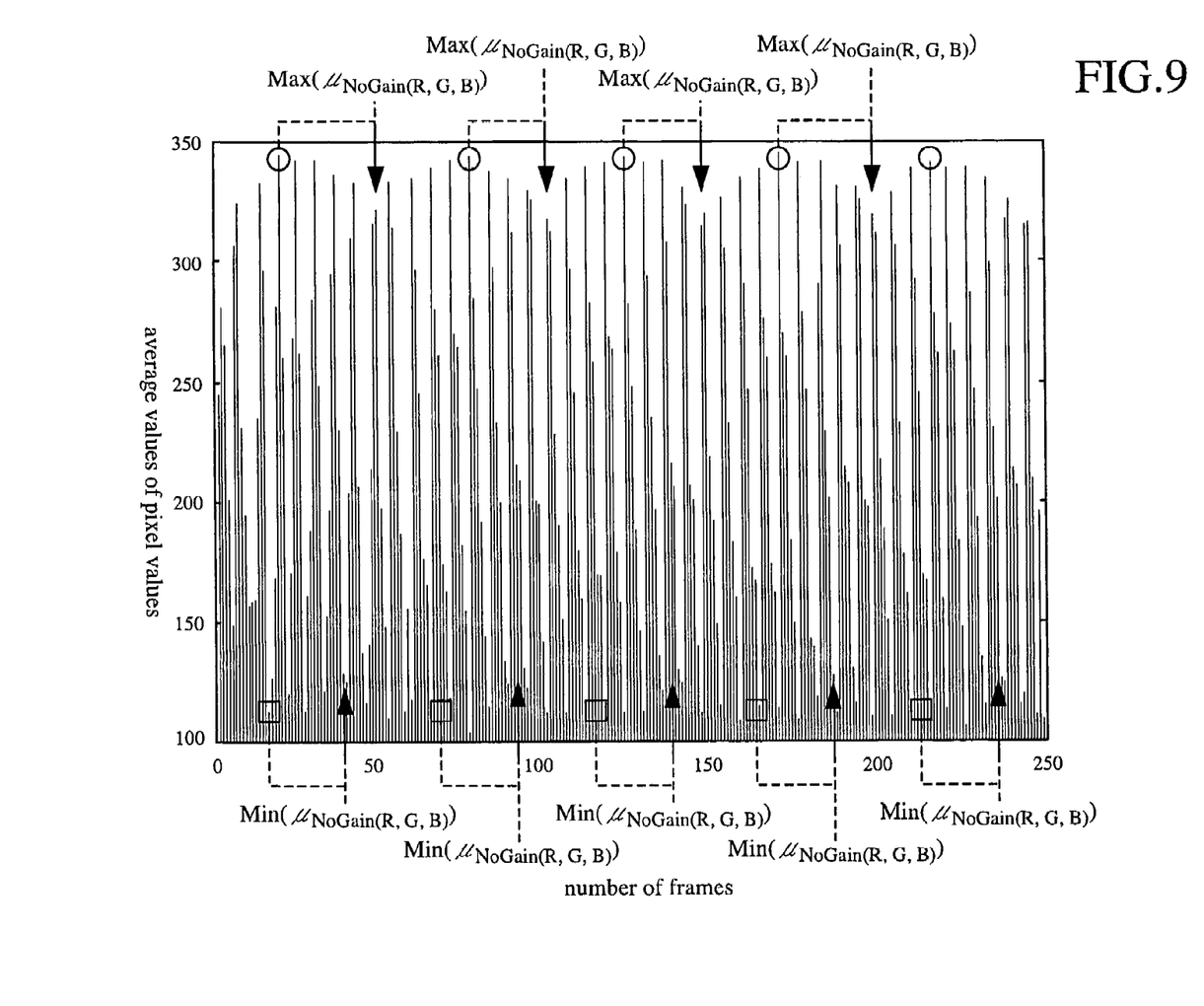
FIG. 9 is a graph illustrating a method of obtaining maximum values and minimum values of a waveform of the deviation of the average values of the pixel values of individual frames in the embodiment 4 in accordance with the present invention.

A method of obtaining the maximum values $\text{Max}(\mu_{NoGain(R,G,B)}(i))$ and minimum values $\text{Min}(_{NoGain(R,G,B)}(i))$ of the deviation waveform of the average values of the pixel values of each frame will be described with reference to FIG. 9.

The vertical axis represents the average values of the pixel values, and the horizontal axis represents the number of frames. Circles each represent the maximum value of the waveform up to the time when the frame number of the maximum value changes, and squares each represent the minimum value of the waveform up to the time when the frame number of the minimum value changes. Since the deviation of the average values of the pixel values of each frame accords with the waveform, the frame number that takes the maximum value and the frame number that takes the minimum value in one cycle of the flicker change cyclically. Thus, detecting the maximum value and minimum value of the waveform up to the changes of the frame number of the maximum value or the frame number of the minimum value, the digital gain calculating circuit 27 updates Min($\mu_{NoGain(R,G,B)}$(i))) and Max($\mu_{NoGain(R,G,B)}$(i))) when the frame number changes.

As for $N_{(R,G,B)}$(i) obtained, the digital gain calculating circuit 27 compares it with the output of the sine wave data calculating circuit 28 with varying the input thereto from 0 to (2n−1), and calculates the optimum sine wave data table numbers $N_{(R,G,B)}$TableNumber(i). In this case, the calculated sine wave data table numbers corresponding to several cycles are stored in the digital gain calculating circuit 27 which calculates the average number of changes of the sine wave data table numbers corresponding to the several cycles. Here, assume that the calculated average number of changes is AveMove(i), then the sine wave data table numbers expected in the next cycle will be $N_{(R,G,B)}$TableNumber(i)+AveMove(i). Receiving the expected sine wave data table numbers, the sine wave data calculating circuit 28 produces the output $N_{Next(R,G,B)}$(i). In addition, the digital gain calculating circuit 27 calculates the average values of the pixel values expected in the next cycle by the inverse operation of expression (12) from $N_{Next(R,G,B)}$(i).

Thus, the digital gain calculating circuit 27 calculates according to the following expression (13) the optimum digital gain $DG_{[5]}$(i) in the next cycle, which is estimated using the sine wave table.

$$DG_{[5]}(i) = \frac{\mu_{Next(R,G,B)}(i)}{\text{Max}(\mu_{NoGain(R,G,B)}(i))} \quad (13)$$

where $\mu_{Next(R,G,B)}$(i) is the values resulting from the calculation of the average values of the pixel values expected in the next cycle by carrying out the inverse operation of expression (12) from $N_{Next(R,G,B)}$(i).

As described above, the present embodiment 4 is configured such that it estimates the deviation of the waveform using the sine wave table according to the fact that the deviation of the average values of the pixel values of each cycle of the flicker generation agrees with the fixed waveform when the power supply frequency has a minute error. As a result, the present embodiment 4 can make more accurate estimation than the linear estimation of the deviation of the waveform in the embodiment 3 in the neighborhood of the maximum values or minimum values, thereby being able to offer an advantage of being able to suppress the flicker more effectively.

Embodiment 5

The foregoing embodiments 2-4 suppose a state in which the digital video camera or digital still camera has a fixed screen, that is, they are stationary. However, considering the actual usage of the digital video camera in particular, it almost always takes pictures of a moving subject such as a person. Thus, the fluctuations in the pixel values due to the movement of the subject (external factors) are added to the fluctuations in the pixel values due to the flicker. The fluctuations in the pixel values due to the external factors do not exert an effect on the flicker. Accordingly, when the fluctuations in the pixel values due to the flicker are mixed with the fluctuations in the pixel values due to the external factors, it is necessary to determine the digital gains by considering only the fluctuations in the pixel values due to the flicker.

When the external factors are added, the average values of the pixel values of the individual RGB color components should change sharply, and the sharp changes can be considered as the application of the external factors. Thus, in the configuration of FIG. 2, the digital gain calculating circuit 27 extracts from the average values of the pixel values calculated by the average value calculating circuit 26 the fluctuations in the calculated average values of the pixel values, and makes a decision that the external factors are added when the fluctuations exceed a specified value (which is set according to the fluctuations in the average values of the pixel values due to the flicker). Thus, the digital gain calculating circuit 27 halts the update of the digital gains using the average values of the pixel values of the RGB color components, and uses the digital gains before the sharp changes in the average values of the pixel values instead. In addition, as for those passing through the error correction, the same error correction as that before the sharp changes in the average values of the pixel values is applied.

As a result, the digital gain calculating circuit 27 carries out the processing in such a manner that it updates the digital gains supplied to the digital signal amplifier 25 when the fluctuations in the pixel values due to the external factors are small, but does not update when the fluctuations in the pixel values due to the external factors are large.

As described above, the present embodiment 5, which applies the foregoing processing when the fluctuations in the pixel values due to the external factors takes place, offers an advantage of being able to suppress the flicker effectively with reducing misoperation due to the external factors.

Embodiment 6

The flicker is a phenomenon that takes place because the amount of charges stored in the solid-state image pickup device varies at every image read timing and the brightness of the image changes. Accordingly, to suppress the flicker, it is sufficient to eliminate the difference in the brightness generated at every image read timing. In view of this, the present embodiment 6 describes a suppressing method of the flicker, which reduces the difference in the brightness by controlling the exposure duration of the solid-state image pickup device at every image read timing.

Figure 10:
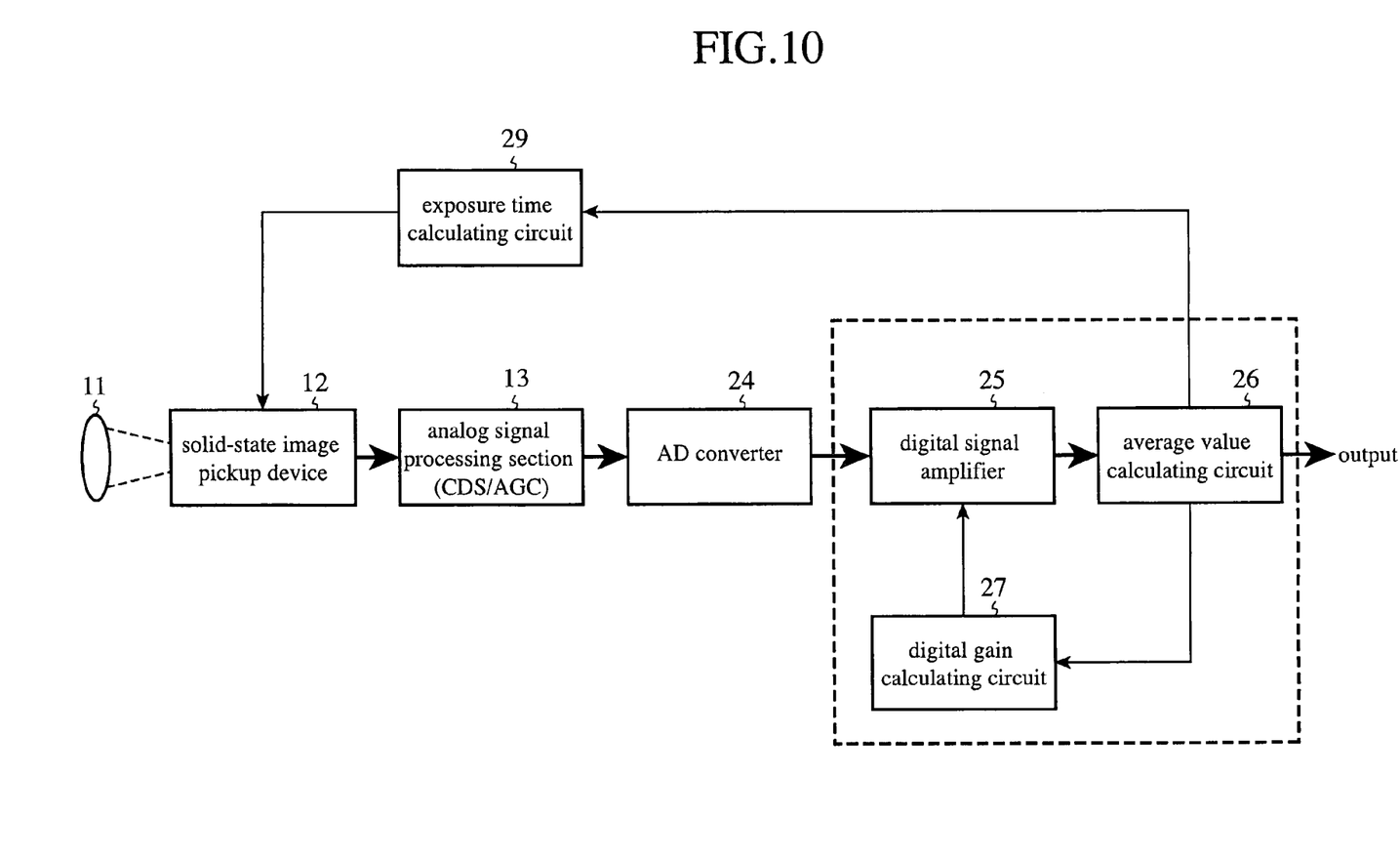
FIG. 10 is a block diagram showing a configuration of an image pickup apparatus of an embodiment 6 in accordance with the present invention.

FIG. 10 is a block diagram showing a configuration of an image pickup apparatus of the embodiment 6 in accordance with the present invention, which includes an exposure time calculating circuit 29 in addition to the configuration of FIG. 2. The exposure time calculating circuit 29 is a means for calculating the optimum exposure duration of the solid-state image pickup device 12 according to the average values of the pixel values obtained by the average value calculating circuit 26.

The method of determining the optimum exposure duration of the solid-state image pickup device 12 by the exposure time calculating circuit 29 is substantially the same as the method of calculating the digital gain described in the foregoing embodiments 1-3. More specifically, a data table is created in advance which describes the relationships between the changes in the exposure duration and the rate of changes in the average values of the pixel values of the individual RGB color components. In addition, a conversion coefficient $k_{CCD(R,G,B)}$ is determined in advance for converting the digital gain to the exposure duration of the solid-state image pickup device 12. Thus, the exposure duration can be handled in the same manner as the digital gain by carrying out the same conversion as expression (6).

More specifically, as for the number of frames in one cycle of the flicker generation, the exposure time calculating circuit 29 calculates the maximum values of the average values of the pixel values of a particular color component of the image of each frame, which are calculated by the average value calculating circuit 26. Next, according to the maximum values, the exposure time calculating circuit 29 adjusts the average values of the pixel values of the particular color component to the maximum range, and controls the exposure duration of the solid-state image pickup device 12 in such a manner as to make constant the amount of charges stored in the solid-state image pickup device 12. Thus, it can determine the exposure duration of the solid-state image pickup device 12 in the next cycle in the same manner as the method of calculating the digital gain.

Consider the difference between the method of calculating the digital gain and the method of calculating the exposure duration of the solid-state image pickup device as the independent methods of suppressing the flicker. The latter has a problem of impairing the S/N ratio because of applying the digital gain to all the pixel. The latter, however, can maintain the S/N ratio at a fixed value so that it is probably superior in the image quality. In addition, unlike the former, since the latter can carry out the correction equal to or less than 1.0 without reducing the saturation level of the pixel values, it has an advantage of having higher flexibility in the correction. However, the latter has a problem in that when the exposure duration of the solid-state image pickup device is set for the G color component, for example, to suppress the flicker, since the same exposure duration is set for the R and B color components, it is impossible to perform the independent processing on the individual RGB color components.

In view of this, the present embodiment 6 suppresses the flicker by controlling the exposure duration of a single color component, first, by the exposure time calculating circuit 29 as described above. Then, as for the errors involved in the remaining color components which are not used by the exposure time calculating circuit 29, the method of adjusting the digital gains is applied to suppress the flicker. More specifically, as for the number of frames in one cycle of the flicker generation, the digital gain calculating circuit 27 calculates the maximum values as to the remaining color components the exposure time calculating circuit 29 does not use from among the average values of the pixel values of the color components of the image, which are calculated by the average value calculating circuit 26. Then, according to the maximum values, the digital gain calculating circuit 27 calculates the digital gains that will adjust the average values of the pixel values of the remaining color components to the maximum range, and supplies the digital gains to the digital signal amplifier 25. The digital signal amplifier 25 suppresses the flicker by controlling the gains of the corresponding pixels of the remaining color components of the digital image signal.

Although the foregoing description is made by way of example of the three color system of the primary colors of light of R (red), G (green) and B (blue), the present invention is also applicable to the four color system of Y (yellow), M (magenta), C (cyan) and K (black).

As described above, the present embodiment 6 employs the method of controlling the exposure duration of the solid-state image pickup device in conjunction with the method of controlling the digital gains. As a result, compared with the flicker suppressing method of controlling only the digital gains, the present embodiment 6 can reduce the frequency of using the digital gains, thereby offering an advantage of being able to suppress the flicker more accurately.

Embodiment 7

The image signal fed from the solid-state image pickup device is an analog signal which is converted to the digital image signal through the A/D conversion, and the image processing is carried out digitally. In this case, the gain applied to the analog signal is referred to as an analog gain here. In the present embodiment 7, a suppressing method of the flicker using the digital gain in conjunction with the analog gain will be described.

Figure 11:
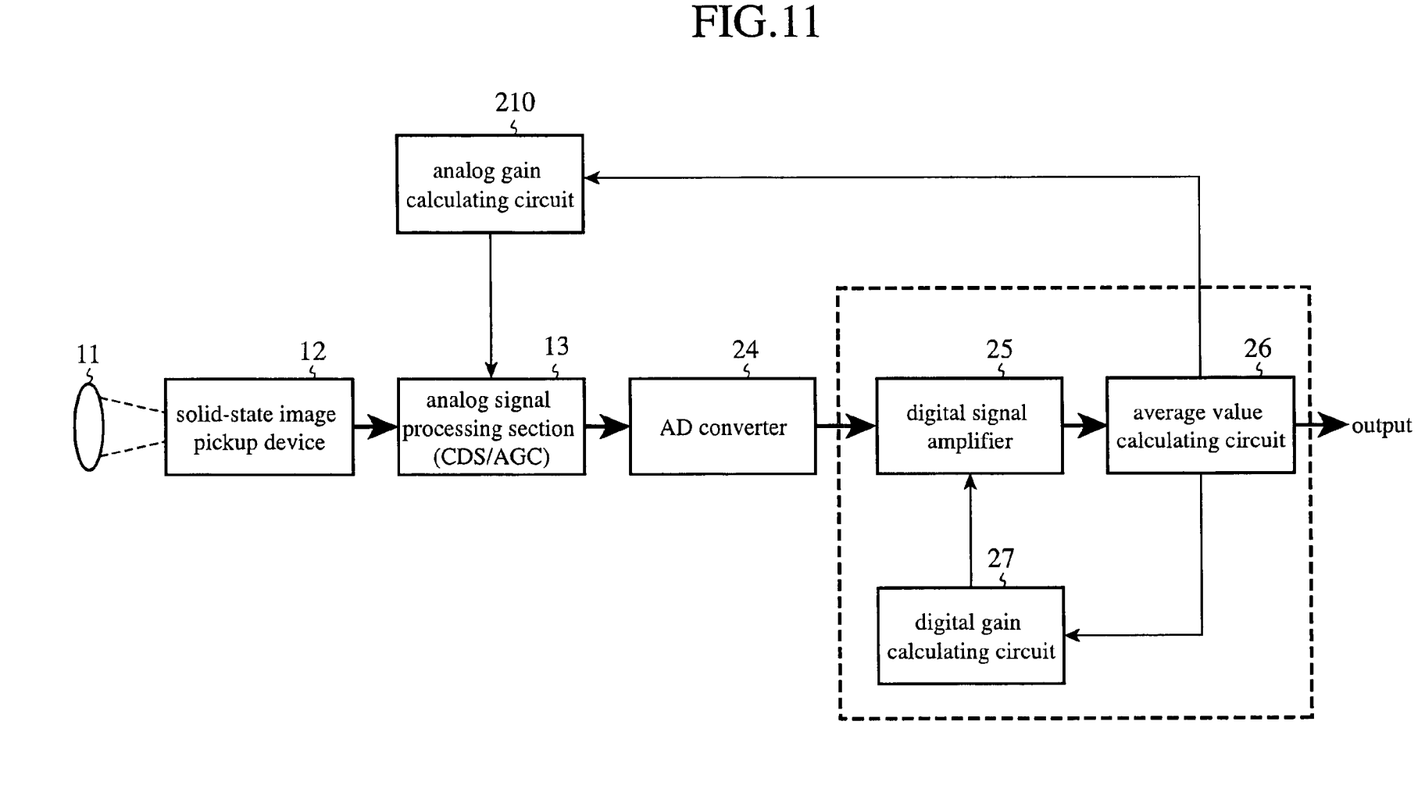
FIG. 11 is a block diagram showing a configuration of an image pickup apparatus of an embodiment 7 in accordance with the present invention.

FIG. 11 is a block diagram showing a configuration of an image pickup apparatus of the embodiment 7 in accordance with the present invention. In addition to the configuration of FIG. 2, it has an analog gain calculating circuit 210 between the average value calculating circuit 26 and the analog signal processing section 13. The analog gain calculating circuit 210 is a means for calculating the optimum analog gain from the average values of the pixel values supplied from the average value calculating circuit 26. Furthermore, in the present embodiment 7, the analog signal processing section 13 before the AD converter 24 operates as an analog signal amplifying means for amplifying the analog image signal supplied from the solid-state image pickup device according to the analog gain of the individual color components fed from the analog gain calculating circuit 210.

The analog gain calculating circuit 210 calculates, as for the number of frames in one cycle of the flicker generation, the maximum value of the average values of the pixel values of a particular color component of the image, which are calculated by the average value calculating circuit 26. Then, according to the maximum value, the analog gain calculating circuit 210 calculates the analog gain for controlling the average values of the pixel values of the particular color component to the maximum range. In this case, it carries out the conversion similar to that given by expression (6) except that it uses a conversion coefficient $k_{AG(R,G,B)}$ for converting the gain to the analog gain instead of the conversion coefficient $k_{DG(R,G,B)}$. The conversion coefficient $k_{AG(R,G,B)}$ is determined in advance by calculating the rate of changes in the pixel values against the changes in the analog gain from the actually measured data. The analog gain calculated by the analog gain calculating circuit 210 is supplied to the analog signal processing section 13 to control the gain of all the pixels of the color components of the image of the analog image signal, thereby suppressing the flicker.

Here, consider the advantages of the method of suppressing the flicker by calculating of the analog gain. It has an advantage of being able to prevent noise by applying the gain to the information before the A/D conversion, which is not deteriorated. However, since the image signal output from the solid-state image pickup device is an analog signal, it is difficult to make a distinction between the individual RGB color components of the output signal to apply analog gains individually to the RGB components of the entire image.

In view of this, as for one target color component specified among the RGB components, the analog gain calculating circuit 210 controls its analog gain as described above to suppress the flicker. Then, as for the errors involved in the other remaining two color components, the digital gain calculating circuit 27 controls the digital gains as described in the embodiment 2, thereby suppressing the flicker. More specifically, as for the number of frames in one cycle of the flicker generation, the digital gain calculating circuit 27 calculates the maximum values as to the remaining color components, which are not used by the analog gain calculating circuit 210, from among the average values of the pixel values of the color components of the image, which are calculated by the average value calculating circuit 26. Then, according to the maximum values, the digital gain calculating circuit 27 calculates the digital gains that will adjust the average values of the pixel values of the remaining color components to the maximum range, and supplies the digital gains to the digital signal amplifier 25. The digital signal amplifier 25 suppresses the flicker by controlling the gains of the corresponding pixels of the remaining two color components of the digital image signal.

As described above, the present embodiment 7 suppresses the flicker using the method of controlling the analog gain in conjunction with the method of controlling the digital gains. As a result, compared with the flicker suppressing method of controlling only the digital gains, the present embodiment 7 can reduce the frequency of using the digital gains, thereby offering an advantage of being able to suppress the flicker more accurately.

INDUSTRIAL APPLICABILITY

Today, digital still cameras and digital video cameras spring into wide use. It is likely that users having these cameras moves more often between different countries or regions with different power supply frequencies. Thus, applying the present invention to these cameras enables the users to handle the cameras without worrying about the flicker, and to take high quality images without fail.

What is claimed is:

1. An image pickup apparatus comprising:
    a solid-state image pickup device for acquiring an image signal by photoelectric conversion of an optical image formed;
    signal amplifying means for amplifying, as to the image signal supplied from said solid-state image pickup device, all pixels of color components of an image according to given gains of the individual color components;
    average value calculating means for calculating average values of pixel values of individual color components constituting an image of each frame generated by said signal amplifying means; and
    gain calculating means for calculating gains by comparing the average values of the pixel values of the individual color components of the image of each frame calculated by said average value calculating means for all the frames in one cycle of flicker generation, calculating maximum values using the average values for all the frames in one cycle of flicker generation, calculating gains according to the maximum values for adjusting the average values to a maximum range, and for outputting the gains as gains of the individual color components to be supplied to said signal amplifying means.

2. An image pickup apparatus comprising:
    a solid-state image pickup device for acquiring an image signal by photoelectric conversion of an optical image formed;
    an AD converter for converting the image signal fed from said solid-state image pickup device to a digital signal;
    digital signal amplifying means for amplifying, as to the digital image signal supplied from said AD converter, all pixels of color components of an image according to given digital gains of the individual color components;
    average value calculating means for calculating average values of pixel values of individual color components constituting an image of each frame generated by said digital signal amplifying means; and
    digital gain calculating means for calculating gains by comparing the average values of the pixel values of the individual color components of the image of each frame calculated by said average value calculating means for all the frames in one cycle of flicker generation, calculating maximum values using the average values for all the frames in one cycle of flicker generation, calculating digital gains according to the maximum values for adjusting the average values to a maximum range, and for outputting the digital gains as digital gains of the individual color components to be supplied to said digital signal amplifying means.

3. The image pickup apparatus according to claim 2, wherein said digital gain calculating means calculates deviation of a flicker generation cycle caused by a power supply frequency error from average values of pixel values of individual color components constituting an image of each frame, which average values are calculated by said average value calculating means; calculates the average values of the pixel values passing through correction of the deviation of the flicker generation cycle calculated; calculates, as to the number of frames in one cycle of the flicker generation, maximum values of the average values of the pixel values passing through the correction of the deviation of the individual color components of the image of each frame; and calculates, according to the maximum values, digital gains for adjusting to a maximum range the average values of the pixel values of the individual color components constituting other images.

4. The image pickup apparatus according to claim 2, further comprising sine wave data calculating means for calculating, by using a sine wave data table prepared in advance, sine wave data for estimating deviation of a next cycle of the flicker generation according to a sine wave data table number input, wherein
    said digital gain calculating means calculates deviation of a flicker generation cycle caused by a power supply frequency error from average values of pixel values of individual color components constituting an image of one flicker cycle, which average values are calculated by said average value calculating means; estimates a sine wave data table number from the deviation calculated; obtains sine wave data of a next cycle from said sine wave data calculating means according to the sine wave data table number estimated; calculates the average values of the pixel values passing through correction of the deviation in the next flicker generation cycle according to the sine wave data in the next cycle; calculates, as to the number of frames in one cycle of the flicker generation, maximum values of the average values of the pixel values passing through the correction of the deviation of the individual color components of the image of each frame; and calculates, according to the maximum values, digital gains for adjusting to a maximum range the average values of the pixel values of the individual color components constituting other images.

5. The image pickup apparatus according to claim 2, wherein when fluctuations in the average values of the pixel values of the individual color components constituting the image of each frame, which average values are calculated by said average value calculating means, exceeds a predetermined value, said digital gain calculating means halts update of the digital gains to be supplied to said digital signal amplifying means, and uses instead digital gains based on the average values of the pixel values before exceeding the predetermined value.

6. The image pickup apparatus according to claim 2, further comprising exposure time calculating means for calculating, as to the number of frames of one cycle of the flicker generation, a maximum value of the average values of the pixel values of a particular color component of the image of each frame, which average values are calculated by said average value calculating means, and for controlling, according to the maximum value, exposure duration of the solid-state image pickup device such that an amount of charges stored in said solid-state image pickup device becomes constant by adjusting to a maximum range the average values of the pixel values of the particular color component, wherein said digital gain calculating means calculates, as to the number of frames in one cycle of the flicker generation, maximum values of the remaining color components not used by said exposure time calculating means from among the average values of the pixel values of the individual color components of the image, which average values are calculated by said average value calculating means, calculates, according to the maximum values, digital gains for adjusting to a maximum range the average values of the pixel values of the remaining color components, and supplies the digital gains to said digital signal amplifying means.

7. The image pickup apparatus according to claim 2, further comprising analog signal amplifying means, which is placed before said AD converter, for amplifying an analog image signal supplied from said solid-state image pickup device according to a given analog gain of the individual color components; and analog gain calculating means for calculating, as to the number of frames of one cycle of the flicker generation, a maximum value of the average values of the pixel values of a particular color component of the image of each frame, which average values are calculated by said average value calculating means, for calculating, according to the maximum value, the analog gain for adjusting the average values of the pixel values of the particular color component to an maximum range, and for outputting the analog gain as the analog gain of the individual color components to be supplied to said analog signal amplifying means, said digital gain calculating means calculates, as to the number of frames in one cycle of the flicker generation, maximum values of the remaining color components not used by said analog gain calculating means from among the average values of the pixel values of the individual color components of the image, which average values are calculated by said average value calculating means, calculates, according to the maximum values, digital gains for adjusting to a maximum range the average values of the pixel values of the remaining color components, and supplies the digital gains to said digital signal amplifying means.

8. A method for image processing comprising:
acquiring an image signal by photoelectric conversion of an optical image formed;
amplifying as to the image signal supplied from said solid-state image pickup device, all pixels of color components of an image according to given gains of the individual color components;
calculating average values of pixel values of individual color components constituting an image of each frame generated by said signal amplifying means;
calculating gains by comparing the average values of the pixel values of the individual color components of the image of each frame calculated by said average value calculating means for all the frames in one cycle of flicker generation;
calculating maximum values using the average values for all the frames in one cycle of flicker generation;
calculating gains according to the maximum values for adjusting the average values to a maximum range; and
outputting the gains as gains of the individual color components to be used when amplifying the image signal.

9. A method for image processing comprising:
acquiring an image signal by photoelectric conversion of an optical image formed;
converting the image signal fed from said solid-state image pickup device to a digital signal;
amplifying, as to the digital image signal supplied from said AD converter, all pixels of color components of an image according to given digital gains of the individual color components;
calculating average values of pixel values of individual color components constituting an image of each frame generated by said digital signal amplifying means;
calculating gains by comparing the average values of the pixel values of the individual color components of the image of each frame calculated by said average value calculating means for all the frames in one cycle of flicker generation;
calculating maximum values using the average values for all the frames in one cycle of flicker generation;
calculating digital gains according to the maximum values for adjusting the average values to a maximum range; and
outputting the digital gains as digital gains of the individual color components to be used when amplifying the digital image signal.

* * * * *